D. CARRICK.
Steam-Washer for Cakes and Biscuits.
No. 168,138. Patented Sept. 28, 1875.
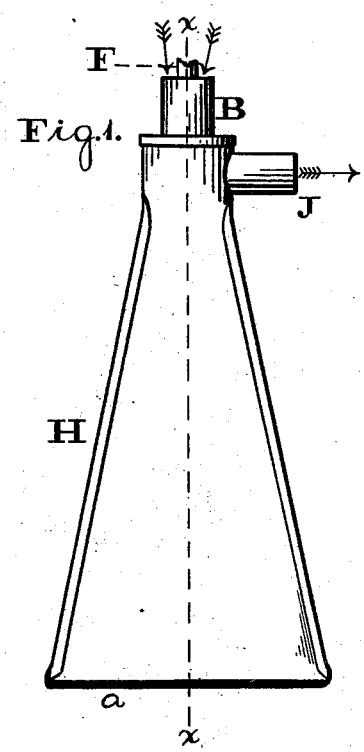
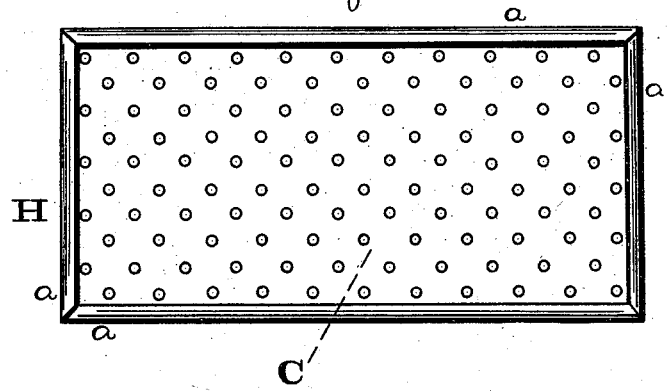
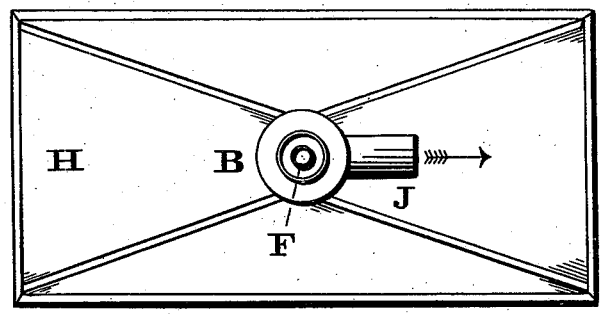
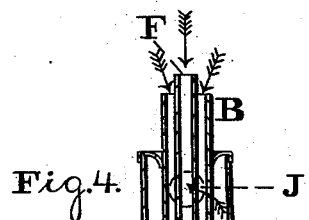
Witnesses:
L. F. Brous
A. P. Grant
Inventor:
David Carrick
by John A. Diederheim
atty.

UNITED STATES PATENT OFFICE.

DAVID CARRICK, OF PHILADELPHIA, PENNSYLVANIA.

IMPROVEMENT IN STEAM-WASHERS FOR CAKES AND BISCUITS.

Specification forming part of Letters Patent No. 168,138, dated September 28, 1875; application filed July 24, 1875.

*To all whom it may concern:*

Be it known that I, DAVID CARRICK, of the city and county of Philadelphia, and State of Pennsylvania, have invented a new and useful Improvement in Steam-Washers for Cakes and Biscuits; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a side view of the device embodying my invention. Fig. 2 is a bottom view thereof. Fig. 3 is a top view thereof. Fig. 4 is a longitudinal section in line $xx$, Fig. 1.

Similar letters of reference indicate corresponding parts in the several figures.

My invention consists in an apparatus constructed to subject cakes and biscuits to the action of steam, whereby their surfaces will be smooth, polished, and present a uniform appearance. It also consists in a pipe and sprinkler, which communicates with the steam-chamber, for moistening the steam, and thus insuring the proper action of the latter on the cakes and biscuits. It further consists in a bonnet surrounding the steam-chamber, so that the steam, after acting on the cakes and biscuits, will be directed upwardly, and thus prevent scalding of the operator.

Referring to the drawings, A represents a dome or vessel, which has a steam-pipe, B, leading thereinto, and a perforated bottom, C. In the dome A there is a partition, D, which forms a chamber, E, in the lower portion thereof, and the pipe B communicates with said chamber. Within the pipe B there is inclosed a pipe, F, which leads from a place of supply of water, and carries at its lower end a rose or sprinkler, G, whose location is in the chamber E, below the partition D. Surrounding the steam-dome A is a bonnet, H, with a space between the two parts, and communicating with the space is a pipe, J. The lower edge of the bonnet is preferably turned inwardly or formed with a ledge, *a*.

The operation is as follows: The apparatus will be properly placed with its perforated bottom C over the tray or pan of unbaked cakes and biscuits, and steam, either exhaust or live, is then admitted into the chamber E through the pipe B, and it fills said chamber, from whence it escapes through the perforations of the bottom C, whereby it is directed on the surfaces of the cakes and biscuits, thus performing what is known as washing, and imparting to the cakes and biscuits a smoothness and polish, and likewise a uniformity in said characteristics. The steam may be made properly moist by the admission of water through the pipe F, the water acting on the steam in the chamber E, and the amount of steam and water may be readily regulated by stop-cocks or valves suitably applied. As the chamber E will be filled with steam, it is evident that the escape thereof will be uniform through the perforations of the bottom C, so that all of the cakes and biscuits will be uniformly treated. The bottom of the bonnet H prevents the lateral escape of the steam, and as the steam rises it passes up the space between the bonnet and steam-dome and out of the pipe J, in which it may condense, the workman being thus protected from the steam.

Having thus described my invention, what I claim as new, and desire to secure by Letters Patent, is—

1. The dome A, with perforated bottom C and steam-pipe B, combined and operating substantially as and for the purpose set forth.

2. The dome A, with perforated bottom C and steam-pipe B, in combination with the partition D in the dome, above said bottom, substantially as and for the purpose set forth.

3. The chamber E, in combination with the steam-pipe B and inclosed water-pipe F, substantially as and for the purpose set forth.

4. The steam-dome A, with perforated bottom C, in combination with the inclosing bonnet H, substantially as and for the purpose set forth.

DAVID CARRICK.

Witnesses:
JOHN A. WIEDERSHEIM,
ALBERT H. HOECKLEY.